(12) United States Patent
Sabripour et al.

(10) Patent No.: US 11,188,775 B2
(45) Date of Patent: Nov. 30, 2021

(54) USING A SENSOR HUB TO GENERATE A TRACKING PROFILE FOR TRACKING AN OBJECT

(71) Applicant: MOTOROLA SOLUTIONS, INC., Chicago, IL (US)

(72) Inventors: Shervin Sabripour, Plantation, FL (US); Goktug Duman, Oakland Park, FL (US); John B. Preston, Plantation, FL (US); Belfug Sener, Plantation, FL (US); Bert Van Der Zaag, Wheat Ridge, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 183 days.

(21) Appl. No.: 16/725,830

(22) Filed: Dec. 23, 2019

(65) Prior Publication Data

US 2021/0192258 A1    Jun. 24, 2021

(51) Int. Cl.
*G06K 9/00* (2006.01)
*G06K 9/32* (2006.01)
(Continued)

(52) U.S. Cl.
CPC ......... *G06K 9/3241* (2013.01); *G06F 16/635* (2019.01); *G06K 9/00201* (2013.01);
(Continued)

(58) Field of Classification Search
CPC ............ G06K 9/3241; G06K 9/00201; G06K 9/00362; G06F 16/635; G06F 2221/2111;
(Continued)

(56) References Cited

U.S. PATENT DOCUMENTS 6,356,868 B1    3/2002 Yuschik et al.
10,096,319 B1   10/2018 Jin et al.
(Continued)

FOREIGN PATENT DOCUMENTS

CN    108766439 A    11/2018
CN    109616125 A    4/2019

OTHER PUBLICATIONS

Talantzis, et al., "Real Time Audio-Visual Person Tracking" IEEE Workshop on Multimedia Signal Processing, 2006 (5 pages).
(Continued)

*Primary Examiner* — Charlotte M Baker
(74) *Attorney, Agent, or Firm* — Michael Best & Friedrich LLP

(57) ABSTRACT

Using sensor hubs for tracking an object. One system includes a first sensor hub and a second sensor hub. The first sensor hub includes a first audio sensor and a first electronic processor. In response to determining that one or more words captured by the first audio sensor is included in the list of trigger words, the first electronic processor generates a first voice signature of a voice of an unidentified person, generates a tracking profile, and transmits the tracking profile to the second sensor hub. The second sensor hub
(Continued)

receives the tracking profile and includes a second electronic processor, a second audio sensor, and a camera. In response to determining that a second voice signature matches the first voice signature, the second electronic processor is configured to determine a visual characteristic of the unidentified person based on an image from the camera and update the tracking profile.

20 Claims, 7 Drawing Sheets

(51) Int. Cl.
  *G06F 16/635* (2019.01)
  *G10L 15/05* (2013.01)
  *G10L 15/22* (2006.01)

(52) U.S. Cl.
  CPC .......... *G06K 9/00362* (2013.01); *G10L 15/05* (2013.01); *G10L 15/22* (2013.01); *G10L 2015/227* (2013.01)

(58) Field of Classification Search
  CPC ......... G06F 21/32; G10L 15/05; G10L 15/22; G10L 2015/227; G10L 17/00; G08B 13/19663; G08B 13/19697; G08B 13/19608; G08B 13/19645
  USPC ......................................................... 382/103
  See application file for complete search history.

(56) References Cited

U.S. PATENT DOCUMENTS

| | | | |
|---|---|---|---|
| 2011/0135152 A1 | 6/2011 | Kashiwagi | |
| 2013/0090942 A1* | 4/2013 | Robinson | G06Q 10/10 705/2 |
| 2014/0337131 A1 | 11/2014 | Edara | |
| 2014/0350924 A1 | 11/2014 | Zurek et al. | |
| 2019/0348048 A1* | 11/2019 | Werner | G06F 16/683 |
| 2020/0213146 A1* | 7/2020 | Kodam | G06F 21/32 |
| 2021/0042724 A1* | 2/2021 | Rathod | G06Q 30/06 |

OTHER PUBLICATIONS

Brodkin, "Amazon patents Alexa tech to tell if you're sick, depressed and sell you meds" ARS Technica, https://arstechnica.com/gadgets/2018/10/amazon-patents-alexa-tech-to-tell-if-youre-sick-depressed-and-sell-you-meds/, Oct. 11, 2018.
International Search Report and Written Opinion for Application No. PCT/US2020/062008 dated Mar. 15, 2021 (15 pages).

* cited by examiner

USING A SENSOR HUB TO GENERATE A TRACKING PROFILE FOR TRACKING AN OBJECT

BACKGROUND OF THE INVENTION

Tracking activities of objects (for example, people, vehicles, objects carried by people, and the like) may be time consuming and difficult as information related to the objects may be gathered in different manners, by different devices, and at different locations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
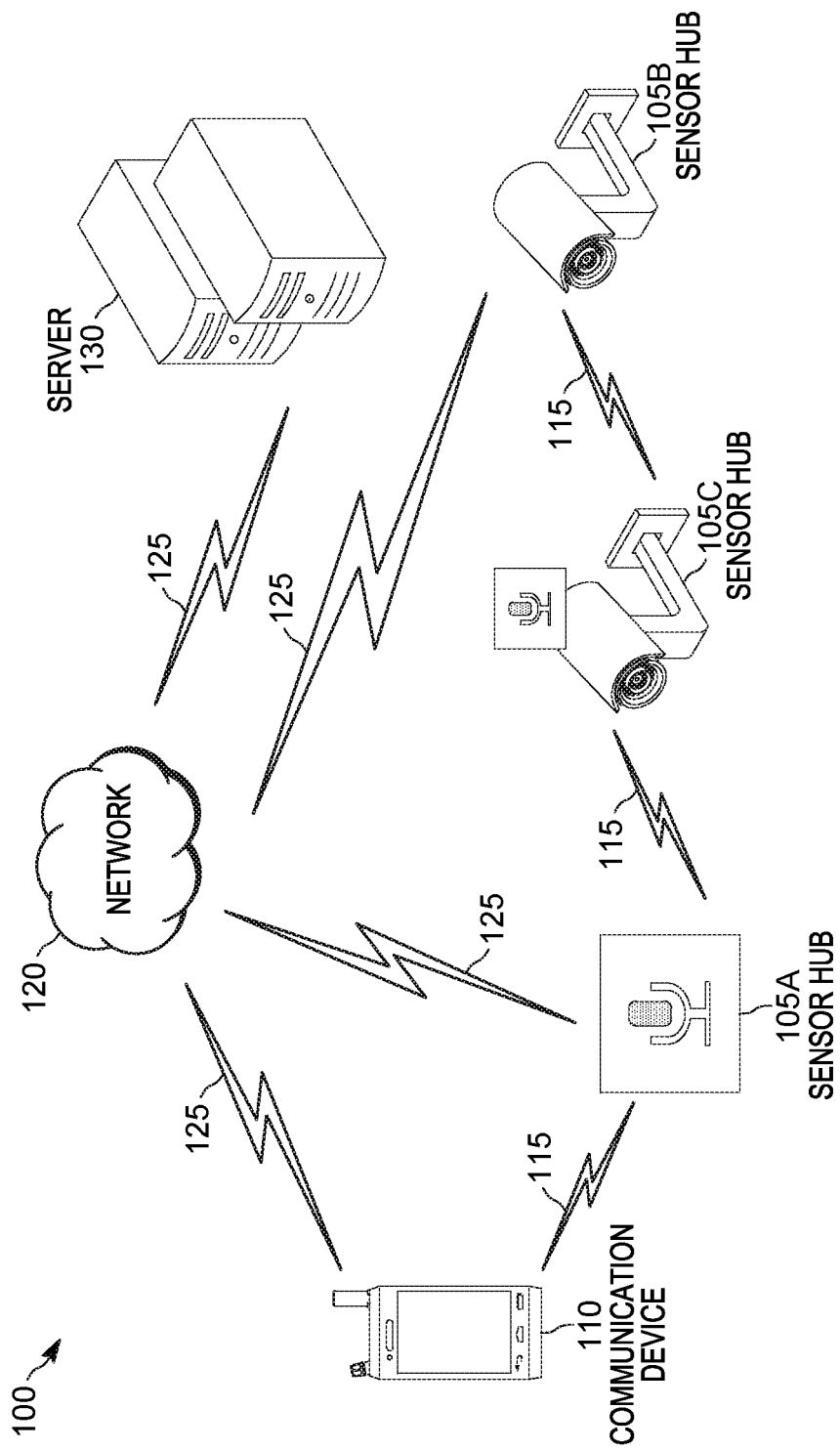
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As stated above, tracking activities of objects (for example, people, vehicles, objects carried by people, and the like) may be time consuming and difficult as information related to the objects may be gathered in different manners, by different devices, and at different locations. For example, tracking activities of objects to attempt to identify a potential threat (for example, a public safety threat such as a bomb threat or a potential shooting, other threats to safety of one or more people such as a fight or disagreement between people, illegal activity such as illegal drug consumption, and the like) may be difficult because monitoring and tracking of all activities of all objects within monitored areas may be overly burdensome (for example, from a processing and memory storage perspective) and unnecessary as many of these activities are unlikely to be relevant to a potential threat. Additionally, some types of information may not be able to be gathered in certain locations due to technological or cost limitations (for example, a camera may not be able to capture accurate images in a poorly lit environment or cameras may be too costly to be installed in every location that is desired to be monitored). Similarly, some sensors such as cameras may not be able to be installed in certain locations due to privacy laws (for example, in bathrooms, locker rooms, or the like). In such places, specific identification of an object to be tracked (for example, the identity of a person) may not be possible. However, it may nevertheless be desirable to track information about the unidentified object to attempt to later identify the object and keep track of past and future activities of the object. Thus, there is a technological problem with respect to tracking objects and, specifically, with respect to triggering tracking of (in other words, identifying when it is proper/desired to track) an unidentified object among a plurality of trackable objects, for example, when information flow may be interrupted (for example, a location lacking a camera) or information from different modalities may have to be analyzed (for example, video at one location and sound at a different location).

Disclosed are, among other things, a method, device, and system for one or more electronic processors to track an object and, specifically, to trigger tracking of (in other words, identifying when it is proper/desired to track) an unidentified object to allow other sensor hubs in a system of sensor hubs to gather additional information about the unidentified object and tag such information as related to the unidentified object. In some embodiments, a first sensor hub generates a tracking profile for the unidentified object based on a detected suspicious/anomalous event (in other words, a trigger event) and transmits the tracking profile to additional sensor hubs including a second sensor hub. When the second sensor hub detects an event that matches with information included in the tracking profile, the second sensor hub updates the tracking profile with information corresponding to the event and transmits an updated tracking profile to the first sensor hub and/or one or more additional sensor hubs.

Accordingly, the disclosed method, device, and system allow for more efficient and accurate tracking of objects by only storing relevant information related to each tracked object in a tracking profile. The disclosed method, device, and system utilize less memory and processing power than monitoring systems that do not generate and update tracking profiles for tracked objects as described herein. The disclosed method, device, and system also allow for tracking of unidentified objects initially detected due to a trigger event detected by a first sensor sub with limited monitoring capabilities (for example, audio only) so that the unidentified object may be later identified by other sensor hubs with more robust monitoring capabilities (for example, video and audio) than the first sensor hub.

One embodiment provides a tracking system including a first sensor hub. The first sensor hub may include a first audio sensor configured to capture a first sound corresponding to one or more words spoken by an unidentified person.

The first sensor hub may also include a memory configured to store a list of trigger words configured to trigger tracking of the unidentified person. The first sensor hub may also include a first electronic processor coupled to the first audio sensor and to the memory. The first electronic processor may be configured to determine that the one or more words is included in the list of trigger words. In response to determining that the one or more words is included in the list of trigger words, the first electronic processor may be configured to generate a first voice signature of a voice of the unidentified person and generate a tracking profile of the unidentified person, wherein the tracking profile includes the first voice signature. The first sensor hub may also include a first network interface coupled to the first electronic processor. In response to determining that the one or more words is included in the list of trigger words, the first electronic processor may be configured to transmit, via the first network interface, the tracking profile to a second sensor hub. The tracking system also includes the second sensor hub that may include a second network interface configured to receive the tracking profile. The second sensor hub may also include a second electronic processor coupled to the second network interface and configured to receive the tracking profile via the second network interface. The second sensor hub may also include a second audio sensor coupled to the second electronic processor and configured to capture a second sound. The second electronic processor may be configured to generate a second voice signature of the second sound and determine that the second voice signature matches the first voice signature of the tracking profile based on the second voice signature meeting a predetermined voice similarity threshold compared to the first voice signature. The second sensor hub may also include a camera coupled to the second electronic processor and configured to capture an image. In response to determining that the second voice signature matches the first voice signature, the second electronic processor may be configured to determine a visual characteristic of the unidentified person based on the image, update the tracking profile of the unidentified person to include information corresponding to the visual characteristic, and transmit, via the second network interface, an updated tracking profile of the unidentified person to at least one of the group consisting of the first sensor hub and one or more additional sensor hubs.

Another embodiment provides a method of tracking an object. The method may include capturing, via one or more audio sensors of a first sensor hub, one or more words spoken by an unidentified person. The method may further include determining, with a first electronic processor of the first sensor hub, that the one or more words include one or more keywords that are identified in a predetermined list. The method may further include in response to determining that the one or more words include one or more keywords that are identified in the predetermined list, extracting, with the first electronic processor, a first voice signature of a voice in which the one or more words were spoken. The method may further include generating, with the first electronic processor, a tracking profile tagging the unidentified person to include the first voice signature. The method may further include transmitting, with the first electronic processor and via a first network interface of the first sensor hub, a tracking request to track the unidentified person to a plurality of other sensor hubs that are deployed relative to a current determined location of the unidentified person. The tracking request may include the tracking profile tagging the unidentified person to the first voice signature. At least some of the plurality of other sensor hubs may include a camera sensor. The method may further include determining, with a second electronic processor of a second sensor hub and based on audio data received from a second audio sensor of the second sensor hub, that the unidentified person has been detected based on a second voice signature matching the first voice signature. The method may further include in response to determining that the unidentified person has been detected, receiving, with the second electronic processor from a first camera sensor of the second sensor hub, information related to one or more visual characteristics attributable to the unidentified person, and determining, with the second electronic processor, a corresponding location at which the unidentified person was detected. The method may further include in response to the information received from the first camera sensor, updating, with the second electronic processor, the tracking profile tagging the unidentified person to include the one or more visual characteristics of the unidentified person and a timeline identifying the corresponding location at which the unidentified person was detected by the second sensor hub.

Another embodiment provides a tracking system including a first sensor hub. The first sensor hub may include a first sensor configured to capture first data, a memory configured to store a list of trigger events configured to trigger tracking of an unidentified person, and a first electronic processor coupled to the first sensor and to the memory. The first electronic processor may be configured to determine that the first data is indicative of a trigger event included in the list of trigger events and that the unidentified person is involved in the trigger event. In response to determining that the first data is indicative of the trigger event included in the list of trigger events and that the unidentified person is involved in the trigger event, the first electronic processor may be configured to generate a tracking profile of the unidentified person. The tracking profile may include information about at least one of the group consisting of the trigger event and the unidentified person, wherein the information is determined based on at least one of the group consisting of the first data from the first sensor and second data from a second sensor of the first sensor hub. The first sensor hub may also include a first network interface coupled to the first electronic processor. In response to determining that the first data is indicative of the trigger event included in the list of trigger events, the first electronic processor may be configured to transmit, via the first network interface, the tracking profile to a second sensor hub. The tracking system may also include the second sensor hub. The second sensor hub may include a second network interface configured to receive the tracking profile, a second electronic processor coupled to the second network interface and configured to receive the tracking profile via the second network interface, and a third sensor coupled to the second electronic processor and configured to capture third data. The second electronic processor may be configured to determine that the third data matches at least a portion of the information included in the tracking profile. In response to determining that the third data matches at least a portion of the information included in the tracking profile, the second electronic processor may be configured to update the tracking profile to include second information about at least one of the group consisting of the third data and fourth data from a fourth sensor of the second sensor hub. The second electronic processor may also be configured to transmit, via the second network interface, an updated tracking profile of the unidentified person to at least one of the group consisting of the first sensor hub and one or more additional sensor hubs.

While some of the examples explained below relate to public safety incidents and public safety officers, in some embodiments, the methods and systems explained below are used by other officers when handling other incidents (for example, incidents at a school, store, amusement park, or the like that are monitored/handled by security officers and/or other employees).

FIG. 1 is a block diagram of a communication system 100 according to one example embodiment. The communication system 100 may also be referred to as a tracking system or a monitoring system. The communication system 100 includes various sensor hubs 105A through 105C. In the following description, when explaining how a single sensor hub functions, a reference to sensor hub 105 is used. As indicated by FIG. 1, the sensor hub 105 may be any one of a number of different types of sensor hubs. For example, the sensor hub 105A includes a microphone configured to capture sound from a monitored area but may not include a camera or other device to capture images of the monitored area (for example, due to cost constraints or privacy laws as mentioned above). As another example, the sensor hub 105B includes a camera configured to capture images of a monitored area but may not include a microphone to capture sound from the monitored area. As yet another example, the sensor hub 105C includes both a microphone and a camera. Although FIG. 1 illustrates three sensor hubs 105, the system 100 may include additional or fewer sensor hubs 105 in other embodiments. The sensor hub 105 may be a device as a sensor hub (DaaSH).

As shown in FIG. 1, the communication system 100 also includes a communication device 110. In some embodiments, the communication device 110 is a portable communication device carried by a public safety officer during patrol. In some embodiments, the communication device 110 is a smart phones or a similar device. The communication device 110 may be a tablet that receives input from a user via a touch screen display from a finger of the user or a stylus held by the user. The communication device 110 may be a vehicular mobile communication device (for example, included in a police vehicle, a fire truck, an ambulance, and the like). As yet another example, the communication device 110 is a computer with a keyboard that may be a desktop computer or a laptop computer. In some embodiments, the communication device 110 is located at a public safety command center and is operated by a public safety officer, such as a commander or a dispatcher, to communicate with public safety officers on patrol at locations outside of the command center. Although FIG. 1 illustrates a single communication device 110, the system 100 may include additional communication devices 110 in other embodiments.

The types of sensor hubs 105 and communication devices 110 described above and shown in FIG. 1 are merely examples. In other embodiments, the communication system 100 includes other types of sensor hubs 105 and/or communication devices 110 (for example, an interactive whiteboard that may be mounted on a wall). In some embodiments, the communication device 110 may act as a sensor hub 105. For example, a communication device 110 including or communicatively coupled to a microphone or a body-worn camera of an public safety officer may collect data with the microphone, body-worn camera, or another sensor and perform similar functions as the sensor hubs 105 that are explained in greater detail below.

In some embodiments, the sensor hubs 105 and/or the communication device 110 are capable of directly wirelessly communicating with each other via direct-mode wireless link(s) 115. For example, the sensor hubs 105 and/or the communication device 110 may form a distributed mesh network. In some embodiments, the sensor hubs 105 and/or the communication device 110 are additionally or alternatively capable of wirelessly communicating with each other via a network 120 (for example, an infrastructure radio access network (RAN)) over respective wireless links 125 and via corresponding transceiver circuits. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. The network 120 may be a wired or a wireless communication network. All or parts of the network 120 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 120 may also include future developed networks.

As shown in FIG. 1, the system 100 also includes a server 130 configured to communicate with the sensor hubs 105 and/or the communication device 110 over the network 120. In some embodiments, the server 130 is a computer maintained, for example, at a call center or public safety command center. The server 130 may store information gathered by the sensor hubs 105 and/or the communication device 110 (for example, information stored in tracking profiles as explained in greater detail below) and may distribute this information to other sensor hubs 105 and/or communication devices 110.

In some embodiments, the network 120 includes a fixed terminal, for example a base station (for example, an eNodeB), repeater, access point, or the like. The fixed terminal may have one or more transceivers that, for example, serve sensor hubs 105 and/or communication devices 110 in a given region or area, known as a 'cell' or 'site', by radio frequency (RF) communication. The sensor hubs 105 and/or communication devices 110 that are in direct communication with a particular fixed terminal are said to be served by the fixed terminal. The network 120 may also include an infrastructure controller (for example, a radio controller, call controller, push-to-talk (PTT) server, zone controller, mobile management entity (MME), base station controller (BSC), mobile switching center (MSC), site controller, Push-to-Talk controller, or other network device). In some embodiments, the infrastructure controller controls communication between multiple sensor hubs 105 and/or communication devices 110 and between the sensor hubs 105 and/or communication devices 110 and other entities. For example, the infrastructure controller allows the sensor hubs 105 and/or the communication devices 110 to access database(s) of the server 130 via an Internet Protocol (IP) network and/or a cloud computing cluster such that the sensor hubs 105 and/or the communication devices 110 may communicate with and retrieve data from and store data in the database(s). The IP network may comprise one or more routers, switches, local area networks (LANs), wireless local area networks (WLANs), wide area networks (WANs), access points, or other network infrastructure, including but not limited to, the public Internet. The cloud computing cluster may be comprised of a plurality of electronic computing devices, with similar components as the communication device 110 as set forth in FIG. 2 below, one or more of which may be executing none, all, or a portion of a methods explained below with respect to, sequentially or in parallel, across the one or more computing devices. The one or more computing devices comprising the cloud computing cluster may be geographically co-located or may be separated by inches, yards, or miles, and inter-connected via electronic and/or optical interconnects.

In some embodiments, the database(s) of the server 130 include a long-term video storage database, a historical or forecasted weather database, an offender database perhaps including facial recognition images to match against, a cartographic database of streets and elevations, a building database that includes building floor plans and/or blueprints, a traffic database of historical or current traffic conditions, or other types of databases. In some embodiments, the databases are maintained by third parties (for example, the National Weather Service or a Department of Transportation, respectively). In some embodiments, the databases are commercial cloud-based storage devices. In some embodiments, the databases are housed on suitable on-premises database servers. The databases described above are merely examples. In some embodiments, the communication system 100 additionally or alternatively includes other databases that store different information. In some embodiments, the databases and/or additional or other databases are integrated with, or internal to, the infrastructure controller of the network 120.

The network 120 may include a plurality of fixed terminals and infrastructure controllers to support a larger geographic footprint and/or a larger number of sensor hubs 105 and/or communication devices 110. In some embodiments, one or more sensor hubs 105 and/or communication devices 110 (for example, a dispatch console, a communication device 110 located at a public safety command center, and the like) are coupled to the infrastructure controller of the network 120 via a wired connection and may access the databases of the server 130 and communicate with other sensor hubs 105 and/or communication devices 110 as described above through the wired connection.

Figure 2:
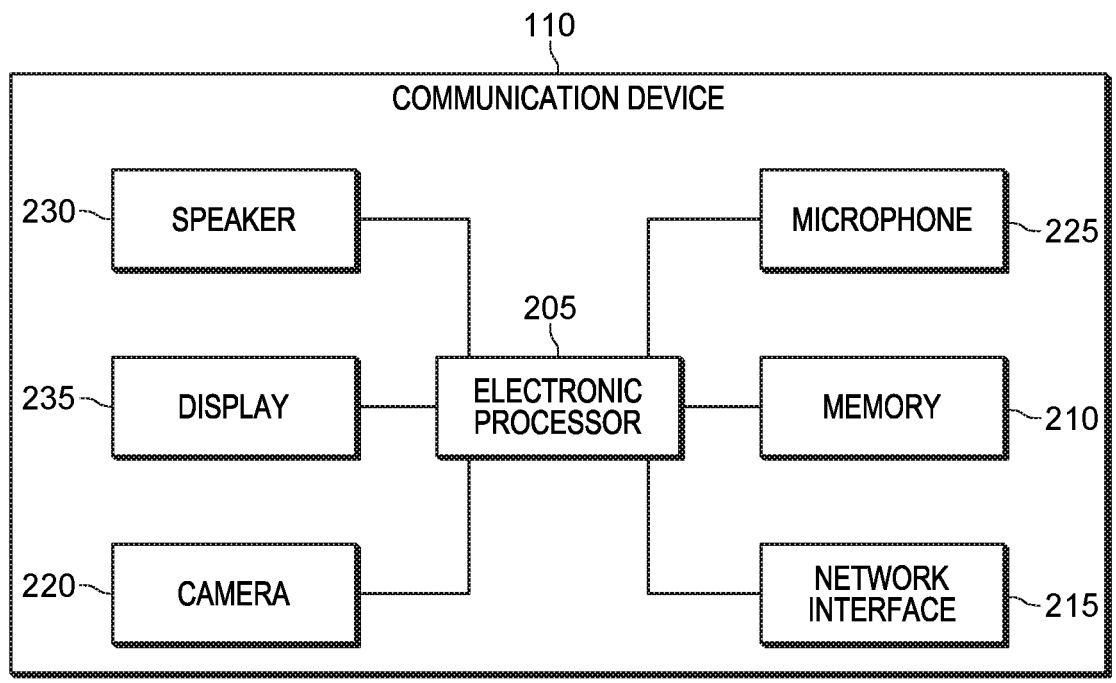
FIG. 2 is a block diagram of a communication device included in the communication system of FIG. 1 according to one example embodiment.

FIG. 2 is a block diagram of a communication device 110 according to one embodiment. In the embodiment illustrated, the communication device 110 includes an electronic processor 205 (for example, a microprocessor or other electronic device). The electronic processor 205 includes input and output interfaces (not shown) and is electrically coupled to a memory 210, a network interface 215, a camera 220, a microphone 225, a speaker 230, and a display 235. In some embodiments, the communication device 110 includes fewer or additional components in configurations different from that illustrated in FIG. 2. For example, the communication device 110 includes a push-to-talk button or a global positioning system (GPS) receiver or a similar component that may determine the geographic coordinates of the location of the communication device 110. In some embodiments, the communication device 110 performs functionality other than the functionality described below.

The memory 210 may include read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein.

The network interface 215 sends and receives data to and from the network 120 and/or to and from other communication devices 110 and/or the sensor hubs 105. For example, the network interface 215 may include one or more transceivers including one or more antennas for wirelessly communicating with the network 120 and/or with other communication devices 110 and/or sensor hubs 105. Additionally or alternatively, the first network interface 215 may include a connector or port for receiving a wired connection to the network 120, such as an Ethernet cable. The electronic processor 205 may communicate one or more images (for example, including single images and series of images that make up a video) generated by the camera 220 over the network 120 through the network interface 315, such as for receipt by another communication device 110 and/or sensor hub 105. In some embodiments, communication of image or video data may occur in approximately real-time. The electronic processor 205 may receive data from the network 120 through the network interface 215, such as from another communication device 110, the sensor hubs 105, and/or the server 130. In some embodiments, the electronic processor 205 receives data through the network interface 215 directly from another communication device 110 and/or sensor hub 105. The electronic processor 205 receives electrical signals representing sound from the microphone 225 and may communicate information relating to the electrical signals through the network interface 215 to other devices, for example, to another communication device 110 and/or to sensor hubs 105. Similarly, the electronic processor 205 may output data received via the network interface 215, for example from another communication device 110 and/or sensor hub 105, through the speaker 230, the display 235, or a combination thereof.

The display 235 displays images, video, and/or text to the user. The display 235 may be a liquid crystal display (LCD) screen or an organic light emitting display (OLED) display screen. In some embodiments, a touch sensitive input interface may be incorporated into the display 235 as well, allowing the user to interact with content provided on the display 235.

In some embodiments, the infrastructure controller of the network 120 and one or more computing devices that comprise the cloud computing cluster of the network 120 include similar components as those shown in FIG. 2 with respect to the communication device 110. For example, the infrastructure controller includes an electronic processor, a memory, and a network interface as described above but may not include the other components shown in FIG. 2.

Figure 3:
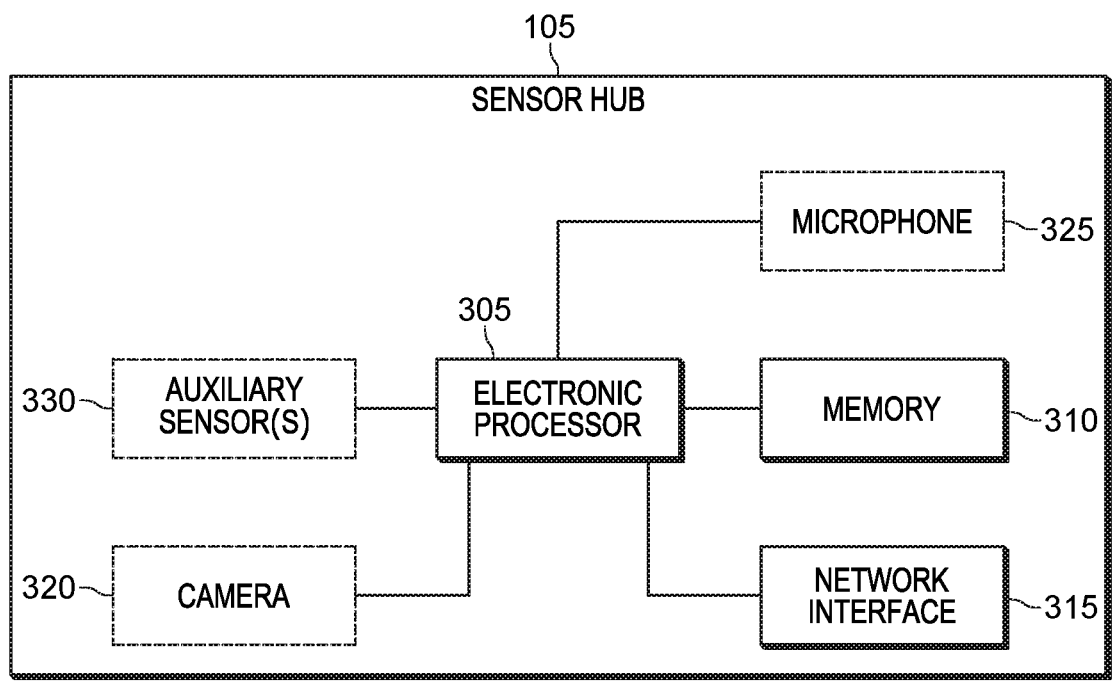
FIG. 3 is a block diagram of a sensor hub included in the communication system of FIG. 1 according to one example embodiment.

FIG. 3 is a block diagram of a sensor hub 105 according to one embodiment. In the embodiment illustrated, the sensor hub 105 includes many similar components as the communication device 110 of FIG. 2. The components of the sensor hub 105 have similar general functionality as the like-named components of the communication device 110 of FIG. 2. As shown in FIG. 3, the sensor hub 105 includes an electronic processor 305, a memory 310, and a network interface 315. The sensor hub 105 may also include one or more sensors configured to capture audio, images (for example, including single images and series of images that make up a video), and/or the like of a monitored area. For example, the sensor hub 105 includes a camera 320, a microphone 325, and/or one or more auxiliary sensors 330 (for example, a smoke detector, a carbon monoxide detector, a thermal camera, other heat sensors, radar sensors, infrared sensors, and/or the like). As indicated by the dashed lines in FIG. 3 and as explained above with respect to FIG. 1, the types of sensors 320, 325, and 330 included in each sensor hub 105 may be different. For example, a first sensor hub 105A may include an audio sensor (in other words, the microphone 325) but may not include a camera sensor (in other words, the camera 320). As another example, a second sensor hub 105C may include the camera 320 and the microphone 325. In some embodiments, the sensor hub 105 includes fewer or additional components in configurations different from that illustrated in FIG. 3. For example, the sensor hub 105 includes a global positioning system (GPS) receiver or a similar component that may determine the geographic coordinates of the location of the sensor hub 105. In some embodiments, the sensor hub 105 performs functionality other than the functionality described below.

In some embodiments, the sensors 320, 325, and/or 330 capture sound, images (for example, including single images and series of images that make up a video), and/or other information related to an unidentified object in a monitored area. In some embodiments, the electronic processor 305 generates a tracking profile of the unidentified object, and the electronic processor 305 transmits the tracking profile (via the network interface 315) to other sensor hubs 105 to attempt to further track and/or identify the unidentified object as explained in greater detail below.

As explained above, tracking activities of objects may be time consuming and difficult as information related to the objects may be gathered in different manners, by different devices, and at different locations. Namely, there is a technological problem with respect to tracking objects and, specifically, with respect to triggering tracking of (in other words, identifying when it is proper/desired to track) an unidentified object among a plurality of trackable objects.

Figure 4:
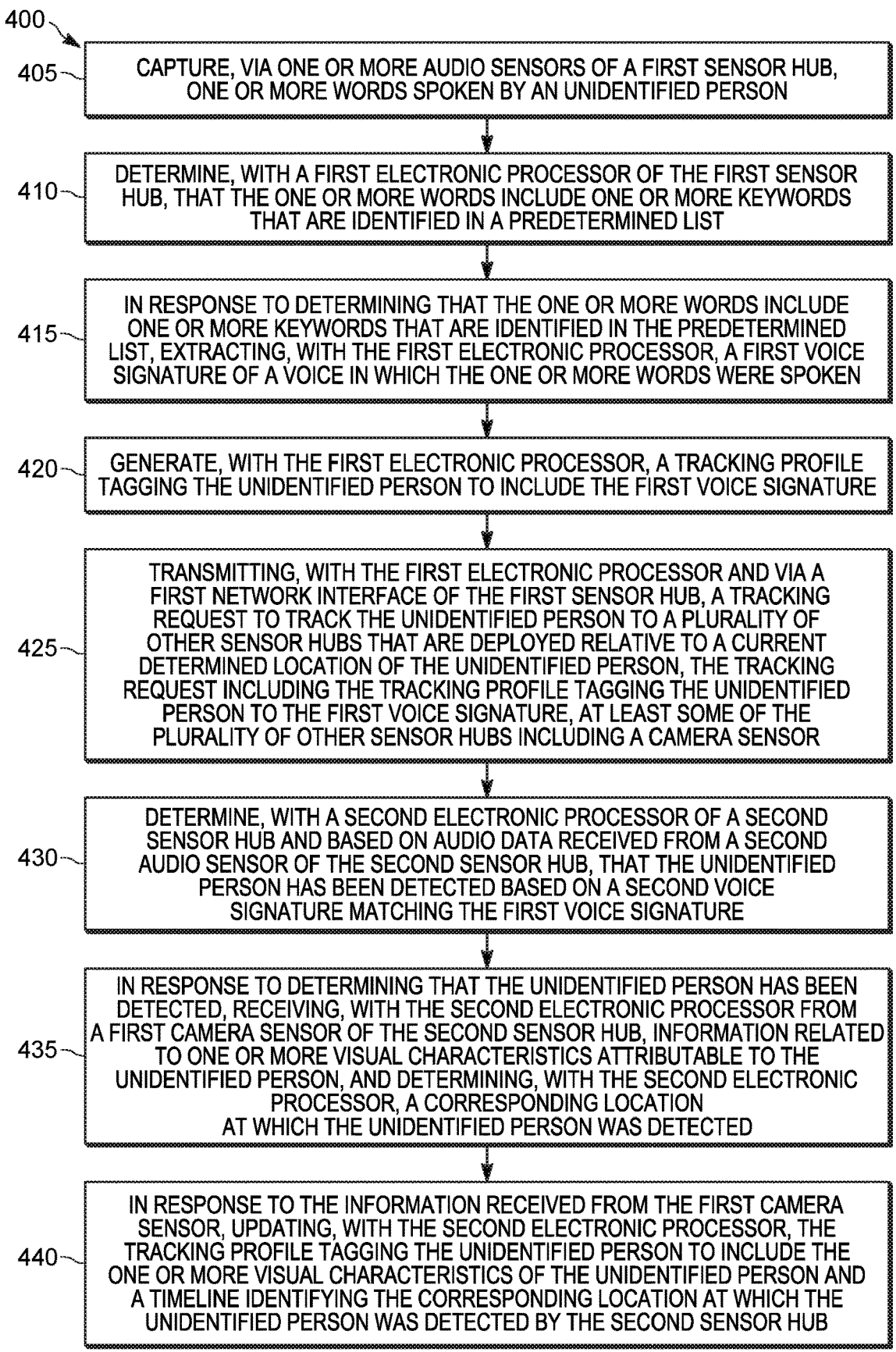
FIG. 4 is a flowchart of a method for tracking an object according to one example embodiment.
Figure 6:
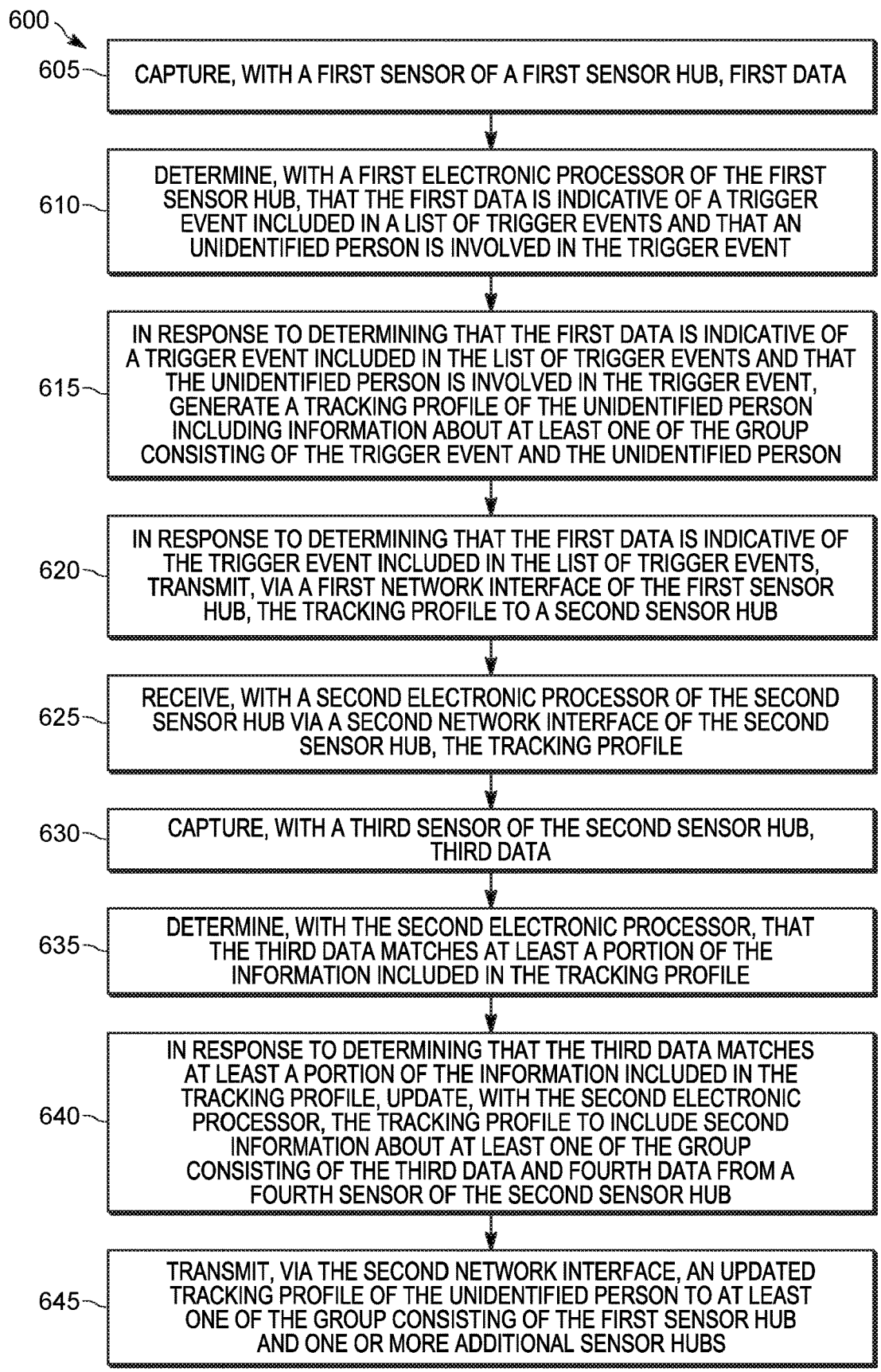
FIG. 6 is a flowchart of another method for tracking an object according to another example embodiment.

To address this technological problem, one or more devices of the system 100 performs, in one instance, a method 400 illustrated in FIG. 4 and/or a method 600 as illustrated in FIG. 6. In some embodiments, the method 400 is executed by a first sensor hub 105 to track an object and, specifically, to trigger tracking of (in other words, identifying when it is proper/desired to track) an unidentified object to allow other sensor hubs 105 in the system 100 to gather additional information about the unidentified object and tag such information as related to the unidentified object.

While the method 400 is explained below as being executed by the electronic processor 305 of a sensor hub 105, in some embodiments, the method 400 is performed in combination by multiple devices in the system 100 that may be referred to as an electronic computing device (for example, the electronic processors 305 of multiple sensor hubs 105 and/or an electronic processor(s) that is part of the network 120 and/or the server 130). In other words, in some embodiments, the electronic computing device that performs the method 400 includes an individual component and/or a combination of individual components of the communication system 100. In some embodiments, the electronic computing device is a single electronic processor 305 (for example, the electronic processor 305 of one sensor hub 105). In other embodiments, the electronic computing device includes multiple electronic processors distributed remotely from each other. For example, the electronic computing device is implemented on a combination of at least two of the electronic processor of a sensor hub 105, a communication device 110, the network 120, and/or the server 130.

FIG. 4 illustrates a flow chart diagram of the method 400 performed by two sensor hubs 105 of the system 100 for tracking an object (for example, a person, a vehicle, an object being carried by a person, or the like). While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At block 405, a first microphone 325 (in other words, a first audio sensor) of a first sensor hub 105 captures one or more words spoken by an unidentified person. At block 410, a first electronic processor 305 of the first sensor hub 105 determines that the one or more words include one or more keywords that are identified in a predetermined list. For example, the memory 310 of the first sensor hub 105 may be configured to store a list of trigger words that include keywords and/or phrases (for example, gun, knife, bomb, drugs, smoke, and the like). The list of trigger words may be programmed into the memory 310 and may be updated as desired by a user or system administrator. The list of trigger words may serve to indicate that a potential threat or illegal activity is occurring or may occur in the future by a speaker of the trigger words (in other words, the unidentified person).

At block 415, in response to determining that the one or more words include one or more keywords that are identified in the predetermined list, the first electronic processor 305 extracts a first voice signature of a voice in which the one or more words were spoken. In some embodiments, to generate the first voice signature, the first electronic processor 305 performs voice analytics on audio data corresponding to the one or more spoken words by, for example, analyzing audio patterns such as pitch, tone, and the like.

At block 420, the first electronic processor 305 generates a tracking profile tagging the unidentified person to include the first voice signature. In some embodiments, the tracking profile may include information relating to the unidentified person that was determined by the first sensor hub 105. For example, the tracking profile may include the first voice signature, the one or more words spoken by the unidentified person that correspond to one or more keywords that are identified in the trigger list, and first location data corresponding to a first location of the first sensor hub 105 that captured this information. As explained previously herein, in some embodiments, the first sensor hub 105 may not include a camera and, thus, may not be able to capture images of a monitored area. Accordingly, while the first sensor hub 105 may be able to determine some information related to the unidentified person, the first sensor hub 105 may not be able to determine other information about the unidentified person (for example, visual appearance, objects being carried by the unidentified person, and the like). Along similar lines, as the first sensor hub 105 may often be a stationary sensor hub 105, a monitored area of the first sensor hub 105 may be limited. For example, as the unidentified person moves within a building, a complex, or a property to different areas, the first sensor hub 105 may no longer be able to monitor/track the unidentified person.

Accordingly, at block 425, the first electronic processor 305 transmits, via a first network interface 315 of the first sensor hub 105, a tracking request to track the unidentified person to a plurality of other sensor hubs 105 that are deployed relative to a current determined location of the unidentified person. In some embodiments, the tracking request includes the tracking profile tagging the unidentified person to the first voice signature. In some embodiments, at least some of the plurality of other sensor hubs 105 include a camera sensor (in other words, the camera 320). By transmitting this tracking request, the first sensor hub 105 notifies nearby sensor hubs 105 to attempt to gather further information related to the unidentified person that the first sensor hub 105 may be unable to gather due to spatial/geographical or technical limitations.

At block 430, a second electronic processor 305 of a second sensor hub 105 that received the tracking profile and the tracking request from the first sensor hub 105 determines, based on audio data received from a second audio sensor 325 of the second sensor hub 105, that the unidentified person has been detected based on a second voice signature matching the first voice signature. For example, the second sensor hub 105 may include a second audio sensor (in other words, a second microphone 325) that captures sound, and the second electronic processor 305 may determine the second voice signature of the sound captured by the second audio sensor 325 in a similar manner as described above with respect to block 415. The second electronic processor 305 may determine that the second voice signature matches the first voice signature based on the second voice signature meeting a predetermined voice similarity threshold compared to the first voice signature. For example, the comparison may take into account characteristics of each voice signature such as audio patterns including as pitch, tone, and the like. In some embodiments, the voice similarity threshold may be adjustable/programmable such that a user or a system administrator may decide a level of certainty between the two voice signatures that must be present before the second electronic processor 305 determines that the unidentified person has been detected by the second sensor hub 105.

In response to determining that the unidentified person has been detected, at block 435, the second electronic processor 305 receives, from a first camera sensor of the second sensor hub 105 (in other words, the camera 320), information related to one or more visual characteristics attributable to the unidentified person. In some embodiments, the second electronic processor 305 uses image analysis techniques to determine which person in one or more images is the unidentified person. For example, the second electronic processor 305 uses image analysis techniques in combination with received audio data to determine which person in a series of images is speaking (by monitoring lip movements of people in the series of images that correspond to the received audio data from the second audio sensor 325). As another example, when the information in the tracking profile indicates that the unidentified person said that they have a gun in a bag, the second electronic processor 305 may use image analysis techniques to determine that only one person in one or more captured images is carrying a bag and is likely the unidentified person. Once the second electronic processor 305 identifies a speaking person that has a matching voice signature with the unidentified person, the second electronic processor 305 may determine the information related to one or more visual characteristics attributable to the unidentified person. For example, the one or more visual characteristics may include facial data, body shape data, hair color data, hair style data, clothing style data, clothing color data, tattoo data, and/or object data related to an object being carried by or used by the unidentified person. In some embodiments, the object data may include identification/recognition of the unidentified person carrying a knife, a gun, or the like. In some embodiments, the object data may include determining that the unidentified person has entered a vehicle and may further include performing license plate recognition of the vehicle or determining other characteristics of the vehicle. The second electronic processor 305 may use image analysis techniques to determine the one or more visual characteristics of the unidentified person.

Also in response to determining that the unidentified person has been detected, at block 435, the second electronic processor 305 determines a corresponding location at which the unidentified person was detected. For example, the second sensor hub 105 may include a global positioning system receiver to determine its location. As another example, a location of the second sensor hub 105 may be stored in its memory 310 when the second sensor hub 105 is installed at its location.

In response to the information received from the first camera sensor 320, the second electronic processor updates the tracking profile tagging the unidentified person to include one or more visual characteristics of the unidentified person and a timeline identifying the corresponding location at which the unidentified person was detected by the second sensor hub 105 (in other words, second location data corresponding to a second location of the second sensor hub 105 where the second location is different than the first location of the first sensor hub 105). In other words, the tracking profile may include a plurality of locations at which the unidentified person has been located as well as time stamps corresponding to the time that the unidentified person was located at each location by each sensor hub 105. The tracking profile may also include information captured by each sensor hub 105 at each location (for example, words spoken by the unidentified person or his/her affiliates, one or more of the visual characteristics described above, and/or the like).

In some embodiments, the second electronic processor 305 generates a detection classifier based on one or more of the visual characteristics determined by the second electronic processor 305. For example, in some situations, the second electronic processor 305 may not be able to determine one of the visual characteristics beyond a minimum learning threshold (for example, because a view of the unidentified person in the images captured by the first camera 320 is obstructed or otherwise hindered). In such situations, the second electronic processor 305 may generate a detection classifier with any information that could be determined from the captured images that is relevant to determination of one or more visual characteristics of the unidentified person. The detection classifier may be included in the updated tracking profile and used by other sensor hubs 105 as a starting point for performing similar image analysis of a similar visual characteristic of the unidentified person to determine the visual characteristic of the unidentified person.

In some embodiments, the second electronic processor 305 is configured to transmit, via the second network interface 315, the updated tracking profile of the unidentified person to at least one of the group consisting of the first sensor hub 105 and one or more additional sensor hubs 105 of the system 100. Accordingly, as additional sensor hubs 105 of the system 100 detect the unidentified person, each sensor hub 105 may continue to update the tracking profile of unidentified person with additional information such as updated locations of the unidentified person, updated audio information based on words spoken by the unidentified person or his/her affiliates, updated visual characteristic information of the unidentified person, and/or the like as well as time stamps of when this example information was gathered by each sensor hub 105.

In some embodiments, at least one of the group consisting of the first electronic processor 305 of the first sensor hub 105, the second electronic processor 305 of the second sensor hub 105, and a third electronic processor of another device (for example, another sensor hub 105, a communication device 110, the network 120, and/or the server 130) is configured to identify the unidentified person based on one or more images captured by the second sensor hub 105. For example, one of these electronic processors may perform facial recognition techniques to determine characteristics of the face of the unidentified person and compare these characteristics to, for example, a criminal database to determine whether the characteristics match those of any criminals in the database. In some embodiments, the facial recognition techniques include recognition of tattoos on the unidentified person. However, the electronic processor may also recognize distinguishing tattoos on other areas of the body of the unidentified person to attempt to identify the unidentified person. Additionally, if the unidentified person enters a vehicle, the electronic processor may perform license plate recognition of the vehicle when attempting to the identify the unidentified person.

When the electronic processor determines that the visual characteristics of the unidentified person match the stored visual characteristics in an identification database (for example, a criminal database), the electronic processor retrieves the identity of the criminal from the database and updates the tracking profile to include the identity of the unidentified person (for example, a name of the unidentified person and other related information such as home address, known associates, past crimes, and/or the like). In some embodiments, the electronic processor determines, based on the identity of the unidentified person, that there is a warrant out for arrest of the unidentified person. For example, the other related information stored in the criminal database that is associated with the unidentified person may indicate that there is a warrant out for arrest of the unidentified person. In response to determining that there is a warrant out for the arrest of the unidentified person, the electronic processor is configured to transmit a notification to at least one of the group consisting of the first sensor hub 105, the second sensor hub 105, the one or more additional sensor hubs 105, and one or more additional devices (for example, one or more communication devices 110). In some embodiments, the notification includes at least some information included in the tracking profile. For example, the notification may provide an identity and a last known location of the unidentified person to a communication device 110 of a nearby public safety officer to allow the public safety officer to be on the lookout (in other words, a BOLO request) to attempt to apprehend the unidentified person.

In some embodiments, a communication device 110 of the system 100 receives the updated tracking profile of the unidentified person from the second sensor hub 105. In some embodiments, the electronic processor 205 (in other words, a third electronic processor) of the communication device 110 is configured to generate a graphical user interface on its display 235 including a timeline including at least two of the group consisting of the one or more words spoken by the unidentified person, the first location data corresponding to the first location of the first sensor hub 105, one or more of the visual characteristics of the unidentified person determined by the second sensor hub 105, and the second location data corresponding to the second location of the second sensor hub 105.

Figure 5A:
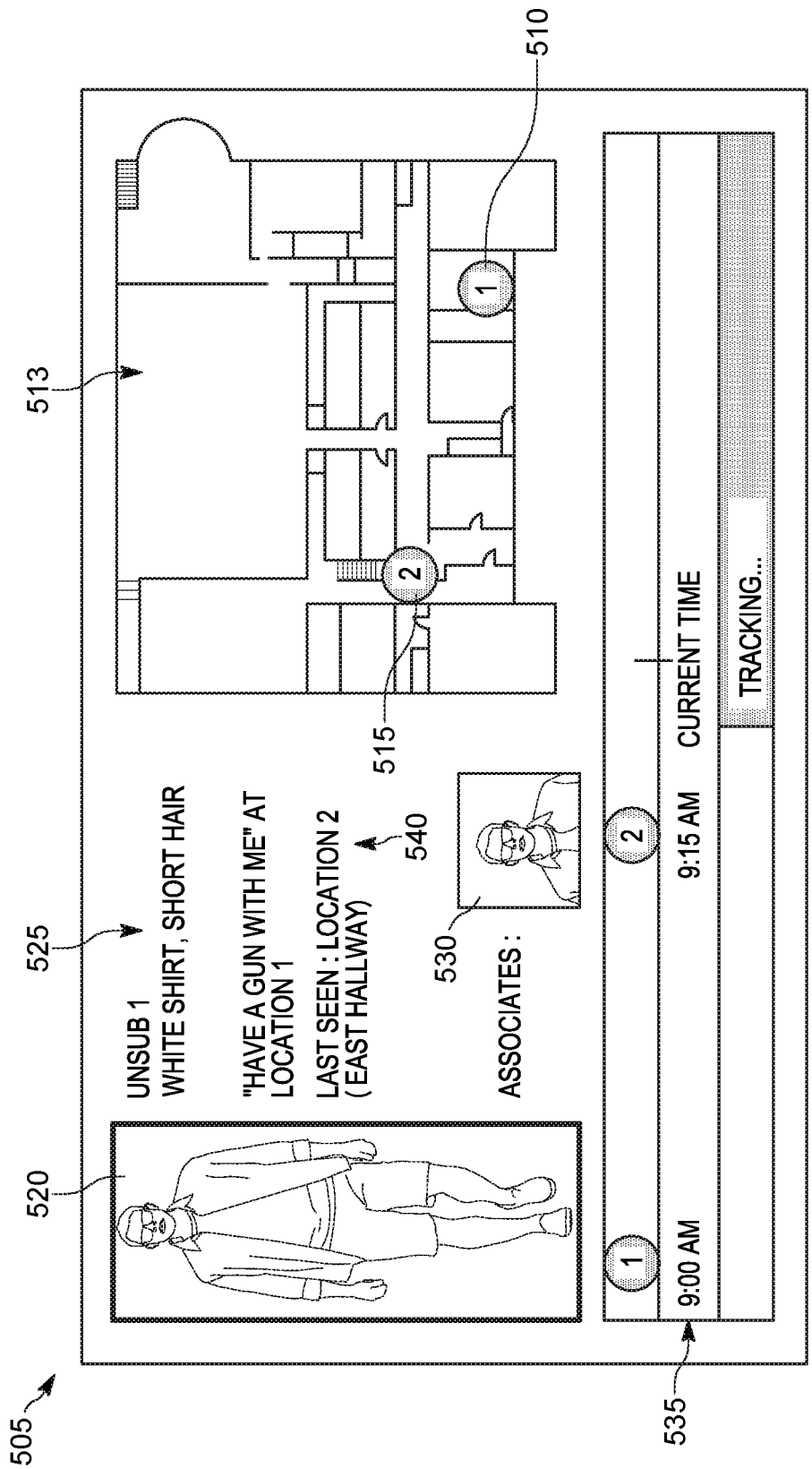
FIG. 5A illustrates a user interface displayed on a display of the communication device of FIG. 3 according to one example embodiment.
Figure 5B:
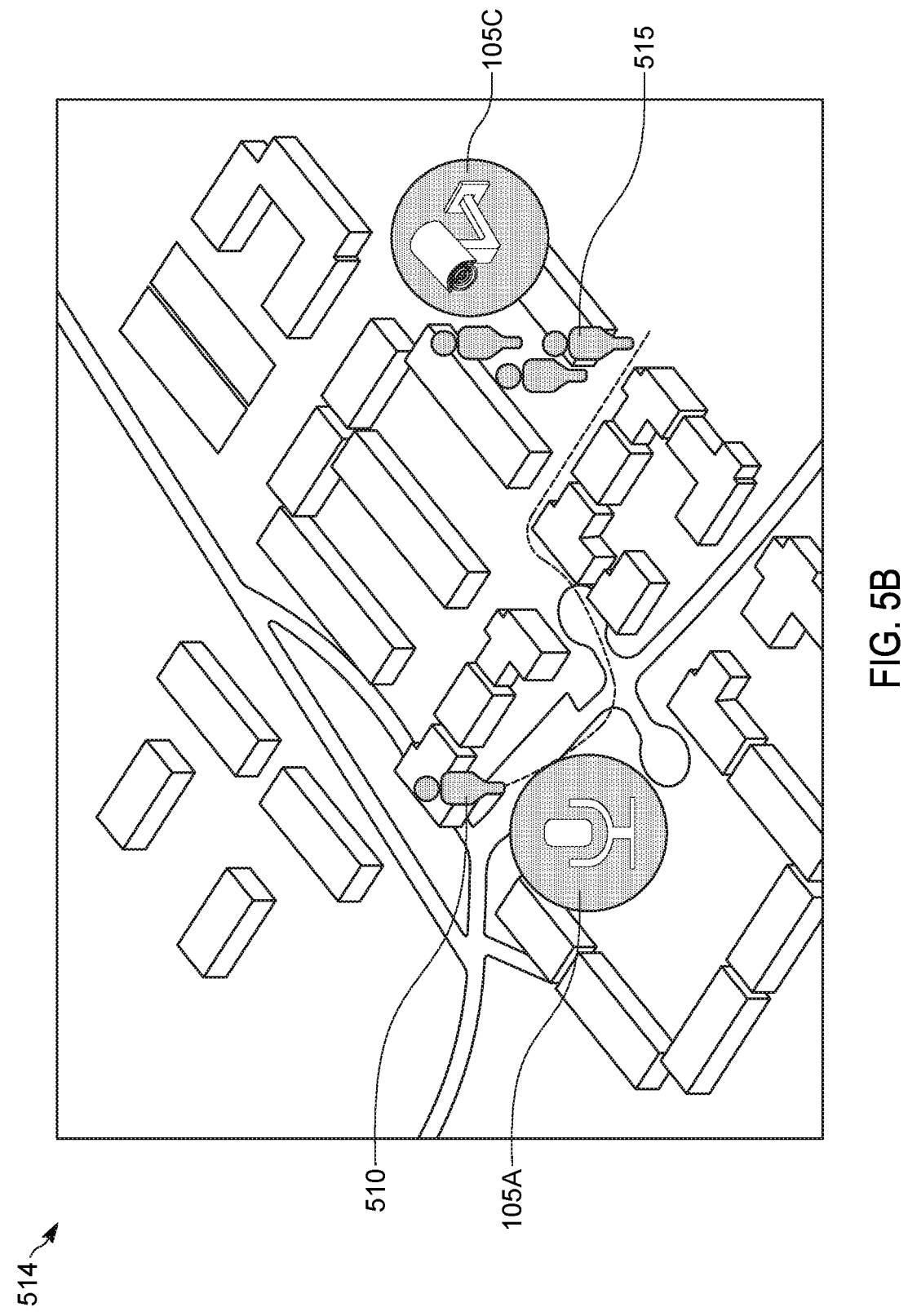
FIG. 5B illustrates an aerial view of an area monitored by the sensor hubs of the communication system of FIG. 1 using the method of FIG. 4 according to one example embodiment.

For example, FIG. 5A illustrates a user interface 505 displayed on the display 235 of the communication device 110 according to one example embodiment. As shown in FIG. 5, the unidentified person is labeled as "Unsub 1" and has been located by a first sensor hub 105 at 9:00 AM at a first location 510 within a map 513 of areas monitored by the sensor hubs 105 of the communication system 100. For example, as indicated in FIG. 5B that illustrates an aerial view of an area 514 monitored by the sensor hubs 105 of the communication system 100, the first sensor hub 105A may include an audio sensor 325 but may not include a camera sensor. The first sensor hub 105A may generate a tracking profile in response to determining that the unidentified person has said "I have a gun with me." The graphical user interface 505 indicates that this language that is included in the list of trigger words was spoken at location 1 at 9:00 AM. In accordance with the method 400 explained above, the first sensor hub 105A transmits the generated tracking profile to other sensor hubs (for example, the second sensor hub 105C). The unidentified person then moves to a second location 515 and begins having a conversation that allows his/her voice to be recognized by the second sensor hub 105C. As described above with respect to the method 400, the second sensor hub 105C determines that a second voice signature of the unidentified person determined from captured sound of a second audio sensor 325 of the second sensor hub 105C matches with a first voice signature of the tracking profile received from the first sensor hub 105A. Accordingly, the second sensor hub 105C updates the tracking profile with additional information capturable by the second sensor hub 105C. For example, as indicated in FIG. 5B, the second sensor hub 105C includes a camera sensor 320 configured to capture images of the unidentified person and associates/affiliates of the unidentified person to identify one or more visual characteristics of the unidentified person. As shown in FIG. 5A, the graphical user interface 505 may display such visual characteristics of the unidentified person. For example, the graphical user interface 505 includes a picture 520 of the unidentified person, a brief description 525 of one or more visual characteristics of the unidentified person, and a picture 530 of an associate/affiliate of the unidentified person. The graphical user interface 505 also includes a timeline 535 indicating the time and location at which the unidentified person was detected by different sensor hubs 105. The graphical user interface 505 also indicates a last seen location 540 of the unidentified person.

In some embodiments, the communication device 110 may provide more details regarding captured information in response to a user selecting an item on the graphical user interface 505. For example, in response to the user selecting an icon corresponding to the first location 510, the communication device 110 may output the words spoken by the unidentified person at the first location 510 and captured by the first sensor hub 105A (in other words, recorded audio of the speech of the unidentified person). Similarly, in response to the user selecting an icon corresponding to the second location 515, the communication device 110 may output the image or video of the unidentified person captured by the second sensor hub 105C.

The graphical user interface 505 of FIG. 5A is an example. In some embodiments, the graphical user interface 505 displays more or less information of the tracking profile in different formats. For example, the timeline 535 may be larger such that information related to each entry of the timeline 535 is incorporated into the timeline 535 itself. In some embodiments, the graphical user interface 505 may not include the map 513 and may instead, for example, include descriptions of each location incorporated into each entry of the timeline 535.

While the above embodiments describe a first sensor hub 105A including a first audio sensor 325 and a second sensor hub 105C including a second audio sensor 325 and a camera sensor 320, in some embodiments, a similar method is performed by sensor hubs 105 with additional or alternative sensors. For example, data received from different sensors besides an audio sensor 325 may be used by a first sensor hub 105 to trigger generation of a tracking profile of an unidentified person. As another example, data besides matching voice signatures may be used by a second sensor hub 105 to determine that the unidentified person has been detected by the second sensor hub 105 and, in response thereto, update the tracking profile.

FIG. 6 illustrates a flow chart diagram of a method 600 performed by two sensor hubs 105 of the system 100 for tracking an object (for example, a person, a vehicle, an object being carried by a person, or the like) according to another example embodiment. While a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure.

At block 605, a first sensor of a first sensor hub 105 captures first data. The first sensor may be a first audio sensor (in other words, the microphone 325) as explained above with respect to block 405 of FIG. 4. For example, the first audio sensor 325 is configured to capture a first sound corresponding to one or more words spoken by an unidentified person. Additionally or alternatively, the first sensor may include an auxiliary sensor 330. For example, the auxiliary sensor 330 is configured to detect/determine that a substance is present (for example, a smoke detector, a carbon monoxide detector, another toxic gas detector, and/or the like). Additionally or alternatively, the first sensor hub 105 may include other auxiliary sensors 330 configured to capture the first data.

At block 610, a first electronic processor 305 of the first sensor hub 105 determines that the first data is indicative of a trigger event included in a list of trigger events and that an unidentified person is involved in the trigger event. In some embodiments, the trigger event includes a suspicious/anomalous event. For example, the first electronic processor 305 determines that the one or more words spoken by the unidentified person are included in a list of trigger words stored in the memory 310 of the first sensor hub 105 and configured to trigger tracking of the unidentified person as explained above with respect to block 410 of FIG. 4. Additionally or alternatively, the first electronic processor 305 detects the presence of smoke (for example, cigarette smoke, marijuana smoke, or the like) and determines that such detection corresponds to a trigger event in a list of trigger events stored in the memory 310 of the first sensor hub 105. As another example, the first electronic processor 305 detects the presence of a gun being carried by the unidentified person (for example, by performing image analysis on received images from a thermal-imaging camera acting as the first sensor). The first electronic processor 305 may determine that detection of a gun in an image corresponds to a trigger event in the list of trigger events stored in the memory 310 of the first sensor hub 105.

The trigger events explained above are merely examples. Other trigger events detectable by the same or different sensors of the first sensor hub 105 may be included in the list of trigger events that is stored in the memory 310 of one or more sensor hubs 105. In some embodiments, a trigger event is an event that is suspicious, anomalous, and/or likely to induce dangerous or illegal behavior. For example, a physical or verbal altercation between two individuals (for example, students at recess) may be determined to be a trigger event that causes the first sensor hub 105 to generate a tracking profile for each individual. For example, the tracking profile may be active for the remainder of the school day to determine whether the two students continue their altercation later in the day at a different location. As another example, a trigger event could be detection of a person having seizure or other physical ailment (for example, falling down a flight of stairs) as determined based on received audio and/or images from sensors of the first sensor hub 105. In some embodiments, different sensor hubs 105 within the same system 100 or in different systems 100 that may be used in different contexts (for example, monitoring a prison versus monitoring an amusement park) may include different trigger events stored in their respective memories 310. In other words, events that may be considered suspicious, anomalous, and/or likely to induce further dangerous or illegal behavior may be different in different contexts in which the system 100 is implemented.

In some embodiments, the first electronic processor 305 determines that the unidentified person is involved in the trigger event by detecting his/her presence in conjunction with detection of the trigger event. For example, the first electronic processor 305 may determine that the unidentified person is carrying a gun using image analysis techniques as explained above. As another example, in conjunction with detecting the presence of smoke, the microphone 325 of the first sensor hub 105 may also detect one or more voices speaking in the area where smoke is detected. Although none of the words spoken by the one or more voices may include one or more keywords included a list of trigger words, the first electronic processor 305 may nevertheless determine a voice signature of the one or more voices in response to determining the presence of the trigger event of smoke detection.

At block 615, in response to determining that the first data is indicative of a trigger event included in the list of trigger events and that the unidentified person is involved in the trigger event, the first electronic processor 305 generates a tracking profile of the unidentified person including information about at least one of the group consisting of the trigger event and the unidentified person. In some embodiments, the information included in the tracking profile is determined by the first electronic processor 305 based on at least one of the group consisting of the first data from the first sensor and second data from a second sensor of the first sensor hub 105. For example, the first electronic processor 305 determines a first voice signature of a voice of the unidentified person as explained immediately above with respect to block 610 and as explained previously herein with respect to blocks 415 and 420 of FIG. 4. The first electronic processor 305 may include the voice signature in the tracking profile. As another example, the first electronic processor 305 generates the tracking profile to include information indicating that the unidentified person is carrying a gun and/or is wearing certain clothing as determined based on image analysis of images received from a camera sensor 320. As yet another example, the first electronic processor 305 generates the tracking profile to include information indicating that the unidentified person was detected in an area where smoke was detected as determined based on data received from a smoke detector. In some embodiments, the first sensor and the first electronic processor 305 are configured to determine the type of detected smoke and may include information indicating the type of detected smoke in the tracking profile.

At block 620, in response to determining that the first data is indicative of the trigger event included in the list of trigger events, the first electronic processor 305 transmits, via a first network interface 315 of the first sensor hub 105, the tracking profile to a second sensor hub 105. In some embodiments, the second sensor hub 105 is located within a predetermined distance of the first sensor hub 105 (for example, within the same building, complex, or property as the first sensor hub 105). In some embodiments, the second sensor hub 105 includes at least one sensor that the first sensor hub 105 does not include (for example, a camera sensor, a smoke detector, and/or the like). In some embodiments, the block 620 of FIG. 6 is similar to the block 425 of FIG. 4. In some embodiments, at block 620, the first sensor hub 105 transmits the tracking profile to other sensor hubs 105 in addition to the second sensor hub 105. Transmitting the tracking profile from the first sensor hub 105 to the second sensor hub 105 (and to other sensor hubs 105) allows multiple sensor hubs 105 to attempt to gather information about the unidentified person, update the tracking profile, attempt to identify the unidentified person, and track the movements and actions of the unidentified person.

As indicated by the explanation previously herein of how the sensor hubs 105 may communicate with each other, the tracking profile may be communicated between sensor hubs 105 directly (for example, via a mesh network formed by the sensor hubs 105) and/or may be communicated between sensor hubs 105 via the network 120.

At block 625, a second electronic processor 305 of the second sensor hub 105 receives, via a second network interface 315 of the second sensor hub 105, the tracking profile. In some embodiments, the second electronic processor 305 stores the tracking profile in the memory 310 of the second sensor hub 105.

At block 630, a third sensor of the second sensor hub 105 captures third data. In some embodiments, block 630 is similar to block 605 described above. The third sensor may be a second audio sensor (in other words, the microphone 325) as explained above with respect to block 430 of FIG. 4. For example, the second audio sensor 325 may be configured to capture a second sound, and the second electronic processor 305 may be configured to generate a second voice signature of the second sound. Additionally or alternatively, the third sensor may include an auxiliary sensor 330. For example, the auxiliary sensor 330 is configured to detect/determine that a substance is present (for example, a smoke detector, a carbon monoxide detector, and/or the like). Additionally or alternatively, the second sensor hub 105 may include other auxiliary sensors 330 configured to capture the third data.

At block 635, the second electronic processor 305 of the second sensor hub 105 determines that the third data matches at least a portion of the information included in the tracking profile. For example, the second electronic processor 305 determines that the second voice signature matches the first voice signature of the tracking profile based on the second voice signature meeting a predetermined voice similarity threshold compared to the first voice signature. In other words, the third data includes sound of the voice of the unidentified person, and the second electronic processor 305 determines that the third data includes a matching voice signature with the first voice signature of the tracking profile as explained above with respect to block 430 of FIG. 4.

In addition to or as an alternative to detecting matching voice signatures of captured spoken words, the second electronic processor 305 may determine that the third data matches at least a portion of the information included in the tracking profile in other manners. In some embodiments, the second electronic processor 305 compares captured information from one or more sensors of the second sensor hub 105 with the information included in the tracking profile to determine a probability that the captured information from the second sensor hub 105 relates to the stored information of the tracking profile from the first sensor hub 105. In some embodiments, the determined probability may be based on a temporal and geographical proximity of the captured information compared to the stored information. For example, the tracking profile may include information indicating that the first sensor hub 105 detected the unidentified person saying, "I am going to go smoke weed." When the second sensor hub 105 detects marijuana ("weed") smoke within a predetermined time of the first sensor hub 105 detecting such speech and the second sensor hub 105 is located within a predetermined distance of the first sensor hub 105, the second electronic processor 305 may determine that there is a high probability (for example, 90%) that detected marijuana smoke matches the statement of the unidentified person in the tracking profile. However, if the second sensor hub 105 is located far away from the first sensor hub 105 such that the unidentified person could not have likely traveled to the second sensor hub 105 within the predetermined time, the second electronic processor 305 may determine that there is a lower probability (for example, 30%) that detected marijuana smoke matches the statement of the unidentified person. As yet another example, the tracking profile may include information indicating that the first sensor hub 105 detected the unidentified person saying, "I have a gun." When the second sensor hub 105 detects a person carrying a gun (for example, as determined based on image analysis of images received from a camera sensor 320), the second electronic processor 305 may determine that the detected gun matches the statement of the unidentified person in the tracking profile. In this example, the second electronic processor 305 may again determine the probability that the detected gun matches the statement of the unidentified person in the tracking profile based on temporal and geographical proximity of the detected gun from the image analysis and the statement of the unidentified person.

In some embodiments, to determine that the third data matches at least a portion of the information included in the tracking profile, the second electronic processor 305 may determine whether the probability that the captured information relates to the stored information is above a predetermined confidence threshold (for example, 50%). When the probability is above the predetermined confidence threshold, the second electronic processor 305 determines that the third data matches the portion of the information included in the tracking profile. On the other hand, when the probability is below the predetermined confidence threshold, the second electronic processor 305 determines that the third data does not match the portion of the information included in the tracking profile. In a situation where the third data is determined not to match the portion of the information included in the tracking profile, the second electronic processor 305 may generate a new tracking profile when the third data independently corresponds to a trigger event (see blocks 605 through 620 of FIG. 6). In some embodiments, the predetermined confidence threshold may be adjustable by a user or system administrator to adjust the amount of information that each sensor hub 105 includes in tracking profiles. For example, a higher confidence threshold may result in less information being stored in each tracking profile but a higher likelihood that the stored information in each tracking profile all relates to the single object being tracked by the tracking profile (for example, the unidentified person). On the other hand, a lower confidence threshold may result in more information being stored in each tracking profile but a higher likelihood that some of the stored information is not related to the single object being tracked by the tracking profile.

At block 640, in response to determining that the third data matches at least a portion of the information included in the tracking profile, the second electronic processor 305 updates the tracking profile to include second information about at least one of the group consisting of the third data and fourth data from a fourth sensor of the second sensor hub 105. For example, when the first sensor hub 105 does not include a camera sensor 320 and the second sensor hub 105 includes a camera sensor 320, the second electronic processor 305 may update the tracking profile to include information related to one or more visual characteristics attributable to the unidentified person as explained above with respect to block 435 and 440 of FIG. 4 (for example, based on one or more images captured by the camera sensor 320). As another example, the second sensor hub 105 may detect the unidentified person based on matching voice signatures (for example, as explained above with respect to block 430 of FIG. 4) and may update the tracking profile to indicate that marijuana smoke was detected at a certain time and location by the fourth sensor of the second sensor hub 105. As yet another example, the second sensor hub 105 may detect the unidentified person based on matching voice signatures (for example, as explained above with respect to block 430 of FIG. 4) and may update the tracking profile to indicate that a gun was visually detected as being carried by the unidentified person (for example, by a camera sensor 320) at a certain time and location by the fourth sensor of the second sensor hub 105. As another example, the second sensor hub 105 may detect the unidentified person based on detecting marijuana smoke after receiving a tracking profile that indicates that the unidentified person previously said, "I am going to smoke weed." In this example, the second sensor hub 105 may update the tracking profile to include information regarding the clothing, estimated height, estimated weight, and/or the like of the unidentified person. As indicated by the above examples, when similar characteristics are detected by the second sensor hub 105 that were detected by the first sensor hub 105 (either by a similar type of sensor or a different type of sensor), the second sensor hub 105 updates the tracking profile of the unidentified person to include any newly-detected information as well as time information and location information of when the newly-detected information was captured by the second sensor hub 105. In other words, the tracking profile includes a timeline of locations at which the unidentified person has been monitored and may also include additional information about the unidentified person as determined by each sensor hub 105 at each location.

In some embodiments, when the second sensor hub 105 is not able to confirm that the unidentified person is involved in a detected event that includes information matching the tracking profile (for example, when matching voice signatures are unable to be confirmed), the second electronic processor 305 may nevertheless update the tracking profile with the information related to the detected event. However, such information may be flagged or otherwise indicated to be speculative/unconfirmed to be related to the unidentified person. For example, the second sensor hub 105 could detect marijuana smoke, but no other sensor data may be available to confirm that the person smoking corresponds to the unidentified person of the tracking profile. In such circumstances and depending on the confidence threshold set by a user or system administrator, the second electronic processor 305 may be configured to nevertheless update the tracking profile to allow the user (for example, public safety officers) to have as much data as possible when tracking the unidentified person. In the event that the user determines that the marijuana smoke is unrelated to the unidentified person of the tracking profile through further investigation, the user may remove the information corresponding to the detected marijuana smoke from the tracking profile.

At block 645, the second electronic processor 305 transmits, via a second network interface 315, an updated tracking profile of the unidentified person to at least one of the group consisting of the first sensor hub 105 and one or more additional sensor hubs 105. As these other sensor hubs 105 continue to monitor respective areas, their electronic processors 305 repeat similar functionality as set forth in blocks 625 through 645 of FIG. 6 to detect the presence of the unidentified person and update the tracking profile of the unidentified person with additional information (for example, information provided by different sensors that were not available on other sensor hubs 105, location information of the unidentified person at different times as the unidentified person moves to different locations, and the like).

Additionally, multiple sensor hubs 105 within the system 100 may perform blocks 605 through 620 of FIG. 6 to generate a tracking profile of an unidentified person in response to detecting a trigger event. In some situations, two different sensor hubs 105 may generate different tracking profiles of the same unidentified person that may be merged into a single tracking profile upon one of the sensor hubs 105 determining that the different tracking profiles both correspond to the same unidentified person. For example, a third electronic processor 305 of a third sensor hub 105 may create a second tracking profile including a third voice signature in response to detecting that one or more trigger words have been spoken by an unidentified person. The third sensor hub 105 may then receive at least one of the tracking profile from the first sensor hub 105 and the updated tracking profile from the second sensor hub 105. The third electronic processor 305 may determine that the second tracking profile generated by the third sensor hub 105 and the at least one of the first tracking profile and the updated tracking profile both correspond to the same unidentified person based on a comparison of information included in the at least one of the first tracking profile and the updated tracking profile and information included in the second tracking profile. For example, the voice signatures of the tracking profiles may be compared to each other and may match each other beyond a predetermined matching threshold. In response thereto, the third electronic processor 305 may merge the second tracking profile and the at least one of the first tracking profile and the updated tracking profile to create a merged tracking profile. The third sensor hub 105 may then transmit, via a third network interface 315, the merged tracking profile to at least one of the group consisting of the first sensor hub 105, the second sensor hub 105, and the one or more additional sensor hubs 105. In some embodiments, the sensor hubs 105 that receive the merged tracking profile delete the previously-stored tracking profile associated with the unidentified person and replace it with the merged tracking profile.

Figure 7:
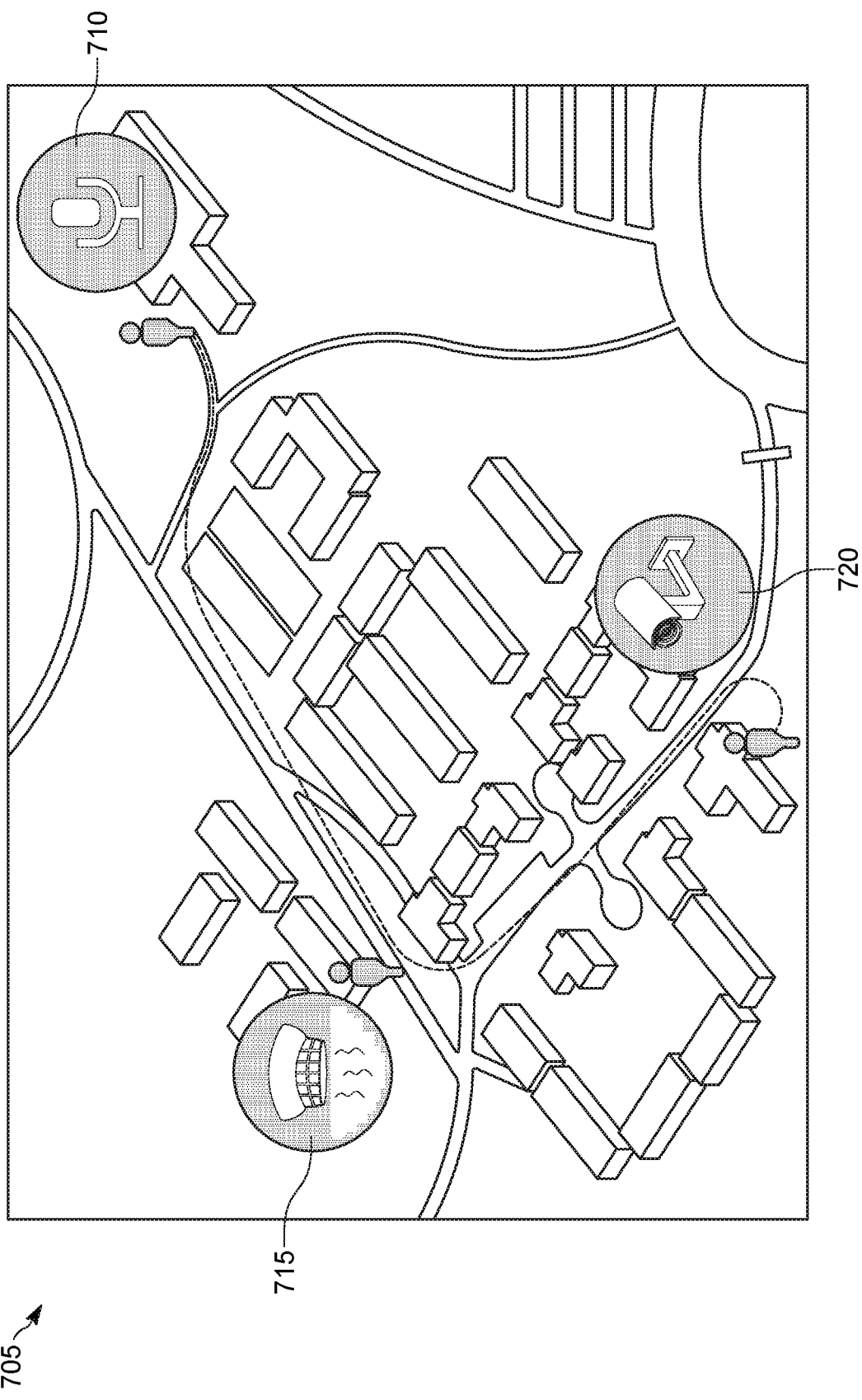
FIG. 7 illustrates an aerial view of another area monitored by the sensor hubs of the communication system of FIG. 1 using the method of FIG. 6 according to one example embodiment.

FIG. 7 illustrates one example of an implementation of the method 600 in an area 705 monitored by the sensor hubs 105 of the communication system 100. A first sensor hub 710 may include an audio sensor 325 but may not include a camera sensor. The first sensor hub 710 may generate a tracking profile in response to determining that the unidentified person has said "I am going to smoke weed." The tracking profile may include a voice signature of the unidentified person as explained previously herein. The first sensor hub 710 may transmit the generated tracking profile to other sensor hubs (for example, the second sensor hub 715 and the third sensor hub 720).

Within the next fifteen minutes, for example, the unidentified person moves to a location nearby the second sensor hub 715 and begins smoking marijuana. The second sensor hub 715 may include a smoke detector that generally detects the presence of smoke and/or specifically detects the type of smoke as marijuana smoke. In response to detecting smoke within a predetermined time and within a predetermined location from when the first sensor hub 710 recorded the marijuana-related speed of the unidentified person that is stored in the tracking profile, the electronic processor 305 of the second sensor hub 715 may update the tracking profile of unidentified person to include this information. For example, the updated tracking profile may include information indicating that marijuana smoke was detected at a certain time and location within temporal and geographical proximity of the recording of the marijuana-related speech. However, like the first sensor hub 710, the second sensor hub 715 also may not include a camera sensor 320. For example, the second sensor hub 715 may be located in a bathroom or other area where privacy laws prevent camera sensors 320 from being located. Accordingly, while some tracking information about the unidentified person is known from the first sensor hub 710 and the second sensor hub 715, there may not be any visual information about the unidentified person stored in the tracking profile. After updating the tracking profile, the second sensor hub 715 may transmit the updated tracking profile to other sensor hubs such as the first sensor hub 710 and the third sensor hub 720 that may replace the initial tracking profile of the unidentified person generated by the first sensor hub 710 with the updated tracking profile from the second sensor hub 715.

Within the next ten minutes, for example, the unidentified person moves to a location nearby the third sensor hub 720 that includes a camera sensor 320. The unidentified person also may begin having a conversation that allows his/her voice to be recognized by the third sensor hub 720. For example, the third sensor hub 720 may compare a determined voice signature to a stored voice signature of the received updated tracking profile as described above. In response to determining that the two voice signatures match, the third sensor hub 720 may capture visual information about the unidentified person using the camera sensor 320 (for example, clothing, height, weight, tattoos, and the like). The third sensor hub 720 may further update the updated tracking profile with this visual information and may transmit this further updated tracking profile to other sensor hubs such as the first sensor hub 710 and the second sensor hub 715 that may replace a previously-stored tracking profile of the unidentified person with the further updated tracking profile from the third sensor hub 720.

In some embodiments, the information included in the tracking profile, the updated tracking profile, and/or the further updated tracking profile is transmitted to a communication device 110 and displayed on a graphical user interface of the display 235 of the communication device 110 (for example, see the graphical user interface 505 of FIG. 5A). In some embodiments, this information is additionally or alternatively uploaded to other devices such as the server 130 for, for example, evidentiary purposes.

In some embodiments, one of the sensor hubs 105 may provide a notification to the communication device 110 in response to detecting a trigger event and/or in response to captured data matching with a previously-stored tracking profile and/or trigger event from a different sensor hub 105. In such embodiments, the notification may include at least a portion of the information included in an updated tracking profile to allow a user of the communication device 110 to analyze previous movements of the unidentified person and any related events for use in potential apprehension of the unidentified person.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A tracking system comprising:
a first sensor hub including
a first audio sensor configured to capture a first sound corresponding to one or more words spoken by an unidentified person,
a memory configured to store a list of trigger words configured to trigger tracking of the unidentified person,
a first electronic processor coupled to the first audio sensor and to the memory, the first electronic processor configured to
determine that the one or more words is included in the list of trigger words, and
in response to determining that the one or more words is included in the list of trigger words, generate a first voice signature of a voice of the unidentified person and generate a tracking profile of the unidentified person, wherein the tracking profile includes the first voice signature, and
a first network interface coupled to the first electronic processor, wherein in response to determining that the one or more words is included in the list of trigger words, the first electronic processor is configured to transmit, via the first network interface, the tracking profile to a second sensor hub; and
the second sensor hub including
a second network interface configured to receive the tracking profile,
a second electronic processor coupled to the second network interface and configured to receive the tracking profile via the second network interface,
a second audio sensor coupled to the second electronic processor and configured to capture a second sound, wherein the second electronic processor is configured to generate a second voice signature of the second sound and determine that the second voice signature matches the first voice signature of the tracking profile based on the second voice signature meeting a predetermined voice similarity threshold compared to the first voice signature,
a camera coupled to the second electronic processor and configured to capture an image, wherein in response to determining that the second voice signature matches the first voice signature, the second electronic processor is configured to
determine a visual characteristic of the unidentified person based on the image,
update the tracking profile of the unidentified person to include information corresponding to the visual characteristic, and
transmit, via the second network interface, an updated tracking profile of the unidentified person to at least one of the group consisting of the first sensor hub and one or more additional sensor hubs.

2. The tracking system of claim 1, wherein the first electronic processor is configured to include first location data corresponding to a first location of the first sensor hub in the tracking profile; and
wherein the second electronic processor is configured to include second location data corresponding to a second location of the second sensor hub in the updated tracking profile, wherein the first location is different than the second location.

3. The tracking system of claim 2, further comprising a communication device including a display and a third electronic processor coupled to the display, wherein the third electronic processor is configured to generate a graphical user interface on the display, the graphical user interface including a timeline including at least two of the group consisting of the one or more words spoken by the unidentified person, the first location data, the visual characteristic of the unidentified person, and the second location data.

4. The tracking system of claim 1, wherein the second sensor hub further comprises an auxiliary sensor coupled to the second electronic processor and configured to detect a presence of a substance, wherein the second electronic processor is configured to determine that the substance is present and that the substance corresponds to the one or more words spoken by the unidentified person;

wherein in response to determining that the substance is present and that the substance corresponds to the one or more words spoken by the unidentified person, the second electronic processor is configured to
- determine the visual characteristic of the unidentified person based on the image,
- update the tracking profile of the unidentified person to include information corresponding to the visual characteristic and information corresponding to the presence of the substance.

5. The tracking system of claim 4, wherein the auxiliary sensor includes a smoke detector and the substance includes smoke.

6. The tracking system of claim 1, wherein at least one of the group consisting of the first electronic processor, the second electronic processor, and a third electronic processor of another device is configured to identify the unidentified person based on the image and update the tracking profile to include an identity of the unidentified person.

7. The tracking system of claim 6, wherein the at least one of the group consisting of the first electronic processor, the second electronic processor, and the third electronic processor of another device is configured to:
- determine, based on the identity of the unidentified person, that there is a warrant out for arrest of the unidentified person; and
- in response to determining that there is a warrant out for the arrest of the unidentified person, transmit a notification to at least one of the group consisting of the first sensor hub, the second sensor hub, the one or more additional sensor hubs, and one or more additional devices, wherein the notification includes at least some information included in the tracking profile.

8. The tracking system of claim 1, further comprising a third sensor hub including:
- a third audio sensor configured to capture a third sound corresponding to a second one or more words spoken by the unidentified person;
- a second memory configured to store the list of trigger words configured to trigger tracking of the unidentified person,
- a third electronic processor coupled to the third audio sensor and to the second memory, the third electronic processor configured to
  - determine that the second one or more words is included in the list of trigger words, and
  - in response to determining that the second one or more words is included in the list of trigger words, generate a third voice signature of the voice of the unidentified person and generate a second tracking profile of the unidentified person, wherein the second tracking profile includes the third voice signature, and
- a third network interface coupled to the third electronic processor and configured to receive at least one of the first tracking profile from the first sensor hub and the updated tracking profile from the second sensor hub;

wherein the third electronic processor is configured to
- receive the at least one of the first tracking profile and the updated tracking profile via the third network interface,
- determine that the second tracking profile and the at least one of the first tracking profile and the updated tracking profile both correspond to the unidentified person based on a comparison of information included in the at least one of the first tracking profile and the updated tracking profile and information included in the second tracking profile,
- in response to determining that the second tracking profile and the at least one of the first tracking profile and the updated tracking profile both correspond to the unidentified person, merge the second tracking profile and the at least one of the first tracking profile and the updated tracking profile to create a merged tracking profile, and
- transmit, via the third network interface, the merged tracking profile to at least one of the group consisting of the first sensor hub, the second sensor hub, and the one or more additional sensor hubs.

9. The tracking system of claim 1, wherein the visual characteristic includes at least one of the group consisting of facial data, body shape data, hair color data, hair style data, clothing style data, clothing color data, tattoo data, and object data related to an object being carried by or used by the unidentified person.

10. A method of tracking an object, the method comprising:
- capturing, via one or more audio sensors of a first sensor hub, one or more words spoken by an unidentified person;
- determining, with a first electronic processor of the first sensor hub, that the one or more words include one or more keywords that are identified in a predetermined list;
- in response to determining that the one or more words include one or more keywords that are identified in the predetermined list, extracting, with the first electronic processor, a first voice signature of a voice in which the one or more words were spoken;
- generating, with the first electronic processor, a tracking profile tagging the unidentified person to include the first voice signature;
- transmitting, with the first electronic processor and via a first network interface of the first sensor hub, a tracking request to track the unidentified person to a plurality of other sensor hubs that are deployed relative to a current determined location of the unidentified person, the tracking request including the tracking profile tagging the unidentified person to the first voice signature, at least some of the plurality of other sensor hubs including a camera sensor;
- determining, with a second electronic processor of a second sensor hub and based on audio data received from a second audio sensor of the second sensor hub, that the unidentified person has been detected based on a second voice signature matching the first voice signature;
- in response to determining that the unidentified person has been detected, receiving, with the second electronic processor from a first camera sensor of the second sensor hub, information related to one or more visual characteristics attributable to the unidentified person, and determining, with the second electronic processor, a corresponding location at which the unidentified person was detected; and
- in response to the information received from the first camera sensor, updating, with the second electronic processor, the tracking profile tagging the unidentified person to include the one or more visual characteristics of the unidentified person and a timeline identifying the corresponding location at which the unidentified person was detected by the second sensor hub.

11. The method of claim 10, wherein the tracking profile includes first location data corresponding to a first location of the first sensor hub and second location data corresponding to a second location of the second sensor hub, wherein the first location is different than the second location.

12. The method of claim 11, further comprising displaying, on a display of a communication device, a graphical user interface including the timeline including at least two of the group consisting of the one or more words spoken by the unidentified person, the first location data, the one or more visual characteristics of the unidentified person, and the second location data.

13. The method of claim 10, further comprising:
- detecting, with an auxiliary sensor of the second sensor hub, a presence of a substance;
- determining, with the second electronic processor, that the substance is present and that the substance corresponds to the one or more words spoken by the unidentified person; and
- in response to determining that the substance is present and that the substance corresponds to the one or more words spoken by the unidentified person,
  - determining, with the second electronic processor, the one or more visual characteristics of the unidentified person, and
  - updating, with the second electronic processor, the tracking profile of the unidentified person to include the one or more visual characteristics and information corresponding to the presence of the substance.

14. The method of claim 13, wherein the auxiliary sensor includes a smoke detector and the substance includes smoke.

15. The method of claim 10, further comprising:
- identifying, with at least one of the group consisting of the first electronic processor, the second electronic processor, and a third electronic processor of another device, the unidentified person based on the one or more visual characteristics; and
- updating, with the at least one of the group consisting of the first electronic processor, the second electronic processor, and the third electronic processor, the tracking profile to include an identity of the unidentified person.

16. The method of claim 15, further comprising:
- determining, with the at least one of the group consisting of the first electronic processor, the second electronic processor, and the third electronic processor, that there is a warrant out for arrest of the unidentified person based on the identity of the unidentified person; and
- in response to determining that there is a warrant out for the arrest of the unidentified person, transmitting, with the at least one of the group consisting of the first electronic processor, the second electronic processor, and a third electronic processor, a notification to at least one of the group consisting of the first sensor hub, the second sensor hub, and one or more additional devices, wherein the notification includes at least some information included in the tracking profile.

17. The method of claim 10, further comprising:
- a third audio sensor configured to capturing, with a third audio sensor of a third sensor hub, a third sound corresponding to a second one or more words spoken by the unidentified person;
- determining, with a third electronic processor of the third sensor hub, that the second one or more words is included in the predetermined list;
- in response to determining that the second one or more words is included in the predetermined list, generating, with the third electronic processor, a third voice signature of the voice of the unidentified person and generate a second tracking profile of the unidentified person, wherein the second tracking profile includes the third voice signature;
- receiving, with the third electronic processor via a third network interface of the third sensor hub, the first tracking profile from at least one of the group consisting of the first sensor hub and the second sensor hub;
- determining, with the third electronic processor, that the second tracking profile and the first tracking profile both correspond to the unidentified person based on a comparison of information included in the first tracking profile and information included in the second tracking profile;
- in response to determining that the second tracking profile and the first tracking profile both correspond to the unidentified person, merging, with the third electronic processor, the second tracking profile and the first tracking profile to create a merged tracking profile; and
- transmitting, with the third electronic processor via the third network interface, the merged tracking profile to at least one of the group consisting of the first sensor hub, the second sensor hub, and one or more additional sensor hubs.

18. The method of claim 10, wherein the one or more visual characteristics includes at least one of the group consisting of facial data, body shape data, hair color data, hair style data, clothing style data, clothing color data, tattoo data, and object data related to an object being carried by or used by the unidentified person.

19. A tracking system comprising:
- a first sensor hub including
  - a first sensor configured to capture first data,
  - a memory configured to store a list of trigger events configured to trigger tracking of an unidentified person,
  - a first electronic processor coupled to the first sensor and to the memory, the first electronic processor configured to
    - determine that the first data is indicative of a trigger event included in the list of trigger events and that the unidentified person is involved in the trigger event, and
    - in response to determining that the first data is indicative of the trigger event included in the list of trigger events and that the unidentified person is involved in the trigger event, generate a tracking profile of the unidentified person, wherein the tracking profile includes information about at least one of the group consisting of the trigger event and the unidentified person, wherein the information is determined based on at least one of the group consisting of the first data from the first sensor and second data from a second sensor of the first sensor hub, and
  - a first network interface coupled to the first electronic processor, wherein in response to determining that the first data is indicative of the trigger event included in the list of trigger events, the first electronic processor is configured to transmit, via the first network interface, the tracking profile to a second sensor hub; and
- the second sensor hub including
  - a second network interface configured to receive the tracking profile, a second electronic processor coupled to the second network interface and configured to receive the tracking profile via the second network interface, a third sensor coupled to the second electronic processor and configured to capture third data, wherein the second electronic processor is configured to determine that the third data matches at least a portion of the information included in the tracking profile, in response to determining that the third data matches at least a portion of the information included in the tracking profile, update the tracking profile to include second information about at least one of the group consisting of the third data and fourth data from a fourth sensor of the second sensor hub, and transmit, via the second network interface, an updated tracking profile of the unidentified person to at least one of the group consisting of the first sensor hub and one or more additional sensor hubs.

20. The tracking system of claim 19, wherein the first sensor includes a first audio sensor, the third sensor includes a second audio sensor, and the fourth sensor includes a camera sensor.

\* \* \* \* \*